United States Patent [19]
Suzuki

[11] Patent Number: 5,659,425
[45] Date of Patent: Aug. 19, 1997

[54] IMMERSION MICROSCOPE OBJECTIVE

[75] Inventor: Toshinobu Suzuki, Hachioji, Japan

[73] Assignee: Olympus Optical Co., Ltd., Tokyo, Japan

[21] Appl. No.: 420,680

[22] Filed: Apr. 12, 1995

[30] Foreign Application Priority Data

Apr. 13, 1994 [JP] Japan .................................. 6-074679

[51] Int. Cl.$^6$ .............................................. G02B 21/02
[52] U.S. Cl. ................................................ 359/658; 359/656
[58] Field of Search ................................. 359/658, 656

[56] References Cited

U.S. PATENT DOCUMENTS

| | | | |
|---|---|---|---|
| 3,659,923 | 5/1972 | Shoemaker | 359/658 |
| 3,700,311 | 10/1972 | Shoemaker | 359/656 |
| 4,373,785 | 2/1983 | Shoemaker | 359/656 |
| 4,537,472 | 8/1985 | Asoma | 359/658 |
| 5,502,596 | 3/1996 | Suzuki | 359/657 |
| 5,517,360 | 5/1996 | Suzuki | 359/658 |
| 5,530,590 | 6/1996 | Saito | 359/658 |
| 5,532,878 | 7/1996 | Suenaga | 359/657 |

FOREIGN PATENT DOCUMENTS

| | | |
|---|---|---|
| 4112378 | 6/1941 | Japan . |
| 0240218 | 10/1986 | Japan .................... 359/656 |
| 61-275813 | 12/1986 | Japan . |
| 404040409 | 2/1992 | Japan .................... 359/658 |
| 0029216 | 2/1994 | Japan .................... 359/658 |
| 6160721 | 6/1994 | Japan . |
| 406175035 | 6/1994 | Japan .................... 359/658 |
| 1720050 | 3/1992 | Russian Federation ............. 359/656 |

Primary Examiner—Georgia Y. Epps
Assistant Examiner—Ricky Mack
Attorney, Agent, or Firm—Cushman, Darby & Cushman IP Group of Pillsbury Madison & Sutro LLP

[57] ABSTRACT

The invention provides an immersion microscope objective which has a magnification of about 100× and a high numerical aperture of the order of 1.65, and is particularly excellent in axial optical properties. The first lens unit $G_1$ consists of a cemented doublet of a plano-convex lens and a meniscus lens concave on the object side and a positive meniscus lens concave on the object side, three in all; the second lens unit $G_2$ consists of a cemented triplet of double-convex, double-concave and double-convex lenses; the third lens unit $G_3$ consists of a cemented doublet of double-convex and double-concave lenses; the fourth lens unit $G_4$ consists of a cemented doublet of a double-convex lens and a negative meniscus lens concave on the object side; the fifth lens unit $G_5$ consists of a cemented doublet of double-convex and double-concave lenses; and the sixth lens unit $G_6$ consists of a cemented doublet of double-concave and double-convex lenses. The lens located on the side proximate to the object has a refractive index of at least 1.6.

16 Claims, 4 Drawing Sheets

FIG. 3
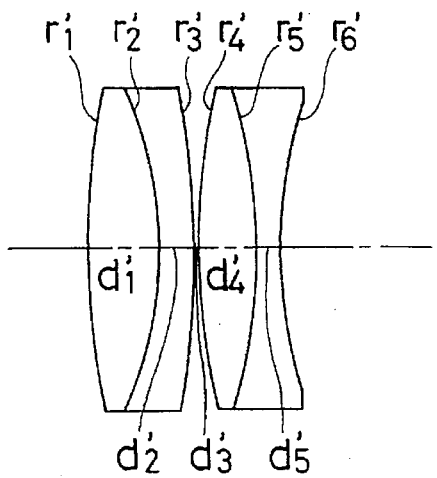
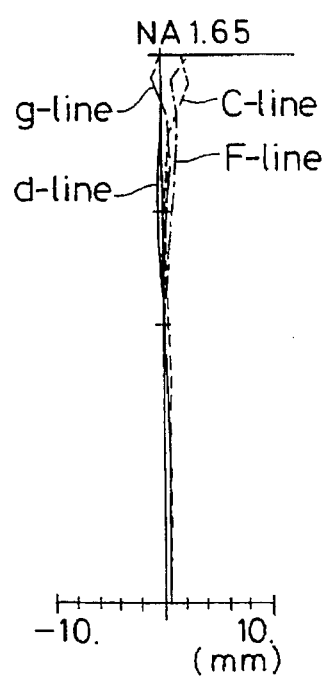
FIG. 4(a)
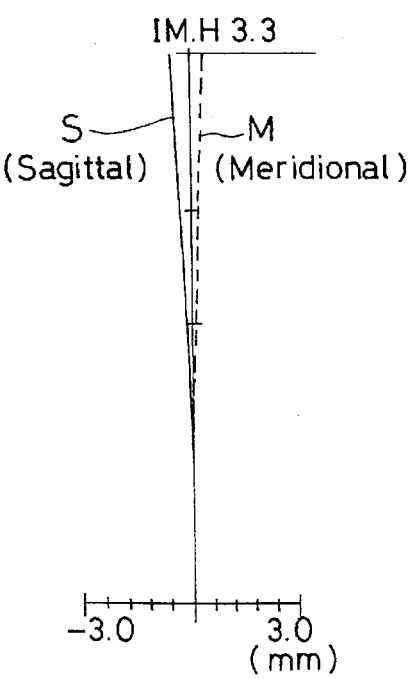
FIG. 4(b)
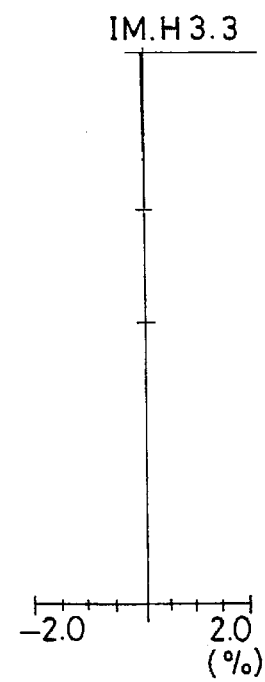
FIG. 4(c)

IMMERSION MICROSCOPE OBJECTIVE

BACKGROUND OF THE INVENTION

1. Field of the Invention

This invention relates to an immersion microscope objective, and more particularly to an immersion microscope objective of the apochromatic class which enables the numerical aperture (NA) to exceed 1.4.

2. Prior Art

Of vital importance for a microscope objective is to allow it to have a high numerical aperture (NA), thereby increasing the resolving power. In this regard, numerous proposals have so far been made in the art. For instance, JP-A 61(1986)-275813 and 4(1992)-311703 disclose microscope objectives which have a numerical aperture of 1.4, are well corrected in terms of chromatic aberration, and are improved in terms of the flatness of image surface as well. Since the immersion oil used has a refractive index of about 1.52, however, it is virtually impossible to achieve a further high numerical aperture, because the axial bundle from an object point on the axis is so diffused that much difficulty is involved in lens design per se. Thus, no objective with NA>1.4 is available.

An objective with NA>1.4 belongs virtually to an unheard-of technology. In recent years, however, microscopes have been used in various ways and differential interference has been used in high-tech fields so that the image can be magnified for video camera observation. The objective of the present invention, as will be explained later, can find some way to the realm of the unknown.

Set out below are objectives which are different in specifications from, but similar in construction to, the microscope objective according to the present invention. JM-B 41(1966)-12378 is not directed to an immersion objective, as can be seen from an NA of 0.8 and a magnification of 65×, but the third lens unit disclosed is similar in shape to the third lens unit of the invention which is one feature of the present invention. It is here to be understood that the present invention distinguishes over JM-B 41-12378 in that the first lens unit does not include a cemented doublet with the cemented surface being concave on the object side and the second lens unit includes no cemented triplet.

U.S. Pat. Nos. 3,700,311 and 4,373,785 are directed to an immersion objective having an NA of 1.3 and a magnification of 100×, which is identical with the present invention in terms of the first, fifth and sixth lens units and similar to the present invention in terms of the shape of the third and fourth lens units as well. However, the present invention distinguishes over them in that the second lens unit includes no cemented triplet and the third lens unit has positive refracting power. In this connection, it is to be noted that the third lens unit of the present invention is characterized by having negative refracting power.

SUMMARY OF THE INVENTION

The present invention has been made in view of such problems as mentioned in association with the prior art, and has for its object the provision of an immersion microscope objective which can have a numerical aperture higher than a conventionally achieved numerical aperture of 1.4 and has particularly improved axial optical performance.

According to one aspect of the present invention, the above-mentioned object is achieved by the provision of an immersion microscope objective which comprises, in order from the object side, a first lens unit having positive refracting power in its entirety and including a cemented lens with the cemented surface being concave on the object side; a second lens unit including a cemented lens of two or more lens components and having positive refracting power in its entirety; a third lens unit including a convex surface on its side proximate to the object, with the surface proximate to the image being strongly concave on the image side, and having negative refracting power in its entirety; a fourth lens unit including a strongly convex surface on its side proximate to the object and having positive refracting power in its entirety; a fifth lens unit including a convex surface on its side proximate to the object, with the surface proximate to the image being concave on the image side; and a sixth lens unit including a concave surface on its side proximate to the object, with the surface proximate to the image being convex on the image side.

According to another aspect of the present invention, there is provided an immersion microscope objective which comprises, in order from the object side, a first lens unit having positive refracting power in its entirety and including a cemented lens with the cemented surface being concave on the object side; a second lens unit including a cemented lens of two or more lens components and having positive refracting power in its entirety; a third lens unit including a convex surface on its side proximate to the object, with the surface proximate to the image being strongly concave on the image side, and having negative refracting power in its entirety; a fourth lens unit including a convex surface on its side proximate to the object and having positive refracting power in its entirety; a fifth lens unit including a convex surface on its side proximate to the object, with the surface proximate to the image being concave on the image side; and a sixth lens unit including a concave surface on its side proximate to the object, with the surface proximate to the image being convex on the image side, said immersion microscope objective further conforming to the following condition (1):

$$0.2 < R_3/R_4 < 1.3 \tag{1}$$

where $R_3$ is the radius of curvature of the surface of the third lens unit that is proximate to the image side and $R_4$ is the radius of curvature of the surface of the fourth lens unit that is proximate to the object side.

Still another aspect of the present invention, there is provided an immersion microscope objective including a plurality of lens units with an immersion oil being applied to the object side of the lens surface proximate to the object for observation, characterized in that the lens proximate to the object side has an index of refraction of at least 1.6.

Preferably, the immersion microscope objective comprises, in order from the object side, a first lens unit having positive refracting power in its entirety and including a cemented lens with the cemented surface being concave on the object side, a second lens unit having positive refracting power in its entirety, a third lens unit having negative refracting power in its entirety, a fourth lens unit having positive refracting power in its entirety, a fifth lens unit with the concave surface being located on the image side, and a sixth lens unit with the concave surface being located on the object side.

Preferably, the second lens unit includes a cemented triplet.

Preferably, the second lens unit includes a cemented triplet consisting of positive, negative and positive lenses, and has positive refracting power in its entirety.

Preferably, the third lens unit includes a convex surface on its side proximate to the object with the surface proximate to the image being strongly concave on the image side, and has negative refracting power in its entirety.

Preferably, the fourth lens unit includes a convex surface on its side proximate to the object, and has positive refracting power in its entirety.

Preferably, the fifth lens unit includes a convex surface on its side proximate to the object with the surface proximate to the image being concave on the image side.

Preferably, the sixth lens unit includes a concave surface on its side proximate to the object with the surface proximate to the image being convex on the image side.

It is then preferable to conform the following condition (1):

$$0.2 < R_3/R_4 < 1.3 \qquad (1)$$

where $R_3$ is the radius of curvature of the surface of the third lens unit that is proximate to the image side and $R_4$ is the radius of curvature of the surface of the fourth lens unit that is proximate to the object side.

It is also preferable to conform to the following condition (2):

$$f/f_3 < -0.01 \qquad (2)$$

where $f_3$ is the focal length of the third lens unit and f is the overall focal length of the objective lens system.

A detailed account will now be given of why the above-mentioned lens arrangements are used and how they work.

To impart a high numerical aperture to the microscope objective an immersion oil having an index of refraction of at least 1.6 is used, and to reduce the occurrence of spherical aberration the index of refraction of the lens proximate to the object side must be at least 1.6.

In the present invention, the front lens of the first lens unit is formed of a cemented lens, while the index of refraction of the object-side lens is made as high as possible with the cemented surface being concave on the object side. This is to reduce the quantity of spherical aberration produced as much as possible.

Within the second lens unit there is disposed a cemented lens consisting of two or more lens components. This is effective for correction for axial chromatic aberration. With a luminous flux incident on the third lens unit, the flux is converged by the convex surface proximate to the object side and negative refracting power is exerted by the surface proximate to the image side, which is strongly concave on the image side. The flux is then diffused by this negative refracting power, but it is again converged by the convex surface of the fourth lens unit that is proximate to the object side. In the case of such a high-magnification and high-numerical aperture type objective, some considerable negative spherical aberration occurs because the overall positive refracting power of the lens system is strong. A point important for objective design is how negative refracting power is ensured for correction for spherical aberration. In the present invention, this is achieved by the so-called air lens effect of the negative refracting power, while an air separation is located between the surface of the third lens unit proximate to the image side and the surface of the fourth lens unit proximate to the object side.

The flux is further converged by the fourth lens unit of positive refracting power, and then allowed to be incident on so-called Gauss lens units, i.e., the fifth and sixth lens units, so that the flatness of the resultant image surface can be secured.

For satisfactory correction for aberrations, it is required to comply with the following condition (1):

$$0.2 < R_3/R_4 < 1.3 \qquad (1)$$

where $R_3$ is the radius of curvature of the surface of the third lens unit that is proximate to the image side and $R_4$ is the radius of curvature of the surface of the fourth lens unit that is proximate to the object side.

The ratio of $R_3$ and $R_4$ should lie within the range defined by condition (1), partly because negative refracting power is needed for correction for spherical aberration and partly because too strong negative refracting power puts the whole aberrations in an ill-balanced state. When the upper limit of 1.3 is exceeded, the whole aberrations are ill balanced because the positive refracting power of the surface of the fourth lens unit proximate to the object side becomes too strong. When the lower limit of 0.2 is not reached, the whole aberrations are again ill balanced because the negative refracting power of the surface of the third lens unit proximate to the image side becomes too strong.

To secure the negative refracting power required for correction for spherical aberration, it is effective to comply with the following condition (2):

$$f/f_3 < -0.01 \qquad (2)$$

where $f_3$ is the focal length of the third lens unit and f is the overall focal length of the objective lens system.

In this connection, the value corresponding to condition (2) in JM-B 41-12378 is $-0.0031$, indicating weak negative refracting power. All conventional objectives have positive refracting power and so depart from condition (2).

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3 is a sectional view of an image formation lens used in combination with the objective of each example, FIGS. 4(a) to 4(c) are aberration diagrams showing the spherical aberration, astigmatism and distortion of Example 1.

DESCRIPTION OF THE PREFERRED EMBODIMENTS

Examples 1 to 3 of the immersion microscope objective according to the present invention will now be explained by way of example but not by way of limitation.

Figure 1:
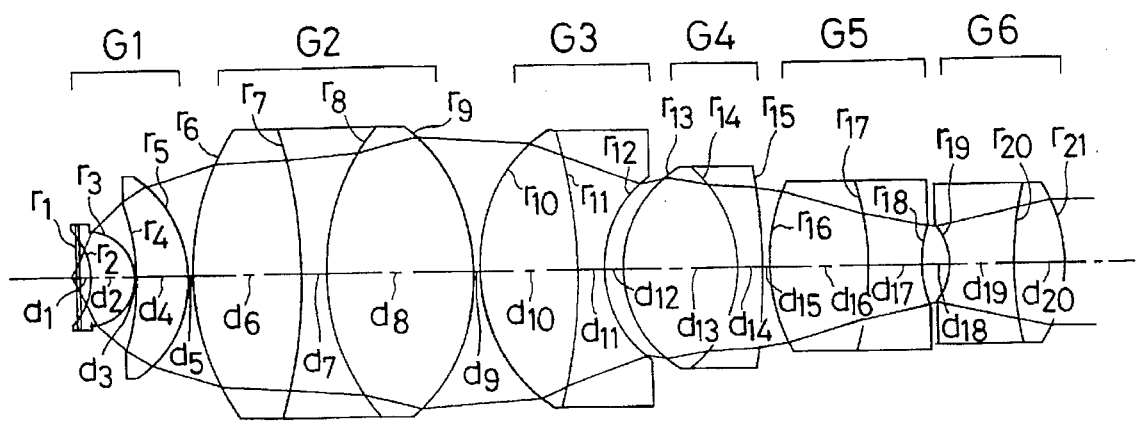
FIG. 1 is a sectional view of Example 1 of the immersion microscope objective according to the present invention.
Figure 2:
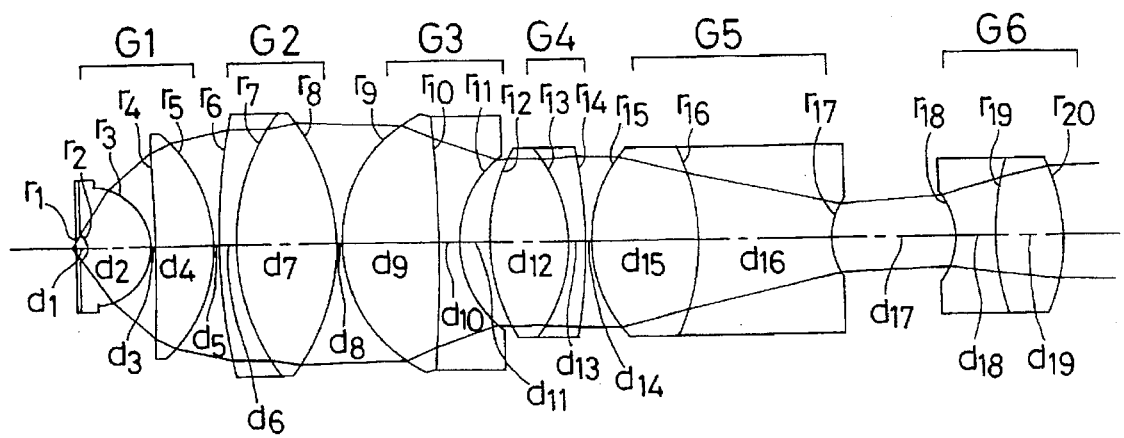
FIG. 2 is a sectional view of Example 3 of the immersion microscope objective according to the present invention.

Lens data on each example will be enumerated later. FIG. 1 is a sectional view of the lens arrangement of Example 1. Example 2 is substantially similar in construction to Example 1, and so is not illustrated. FIG. 2 is a sectional view of the lens arrangement of Example 3.

In each of Examples 1 and 2, the first lens unit $G_1$ consists of a cemented doublet of a plano-convex lens and a meniscus lens concave on the object side and a positive meniscus lens concave on the object side, three in all; the second lens unit $G_2$ consists of a cemented triplet of double-convex, double-concave and double-convex lenses; the third lens unit $G_3$ consists of a cemented doublet of double-convex and double-concave lenses; the fourth lens unit $G_4$ consists of a cemented doublet of a double-convex lens and a negative meniscus lens with the concave surface being located on the object side; the fifth lens unit $G_5$ consists of a cemented doublet of double-convex and double-concave lenses; and the sixth lens unit $G_6$ consists of a cemented doublet of double-concave and double-convex lenses.

In Example 3, the first lent unit $G_1$ consists of a cemented doublet of a plano-convex lens and a meniscus lens with the concave surface being located on the object side and a positive meniscus lens with the concave surface being located on the object side, three in all; the second lens unit $G_2$ consists of a cemented doublet of a negative meniscus lens with the convex surface being located on the object side and a double-convex lens, two in all; the third lens unit $G_3$ consists of a cemented doublet of double-concave and double-convex lenses; the fourth lens unit $G_4$ consists of a cemented doublet of a double-convex lens and a negative meniscus lens with the concave surface being located on the object side; the fifth lens unit $G_5$ consists of a cemented doublet of double-convex and double-concave lenses; and the sixth lens unit $G_6$ consists of a cemented doublet of double-concave and double-convex lenses.

Enumerated below will be numerical data on each example. The symbols used hereinafter but not hereinbefore have the following meanings:

$r_1, r_2, \ldots$ the radii of curvature of the lens surfaces as indicated in order from the object side $d_1, d_2, \ldots$ the separations between the lens surfaces as indicated in order from the object side $n_{d1}, n_{d2}, \ldots$ the d-line indices of refraction of the lenses as indicated in order from the object side $v_{d1}, v_{d2}, \ldots$ the Abbe's number of the lenses as indicated in order from the object side.

In both Examples 1 and 2, the focal length is f=1.8, the magnification is 100×, the numerical aperture is NA=1.65, and the working distance is 0.1289. They are both of the immersion type, and the refractive indices of the immersion oil used here are $n_d$=1.78035, $n_C$=1.76883, $n_F$=1.80975 and $n_g$=1.83503. Notice that the affixes d, C, F and g represent values with respect to the d-, C-, F- and g-lines. The d-line index of refraction, Abbe's number and thickness of the cover glass used are designed to be $n_d$=1.7865, $v_d$=50.0 and d=0.17 mm.

In Example 3, the focal length is f=1.8, the magnification is 100×, the numerical aperture is NA=1.25, and the working distance is 0.1329. This is again of the immersion type, and the indices of refraction of the immersion oil used are $n_d$=1.51548, $n_C$=1.51198, $n_F$=1.52394 and $n_g$=1.53088. The d-line index of refraction, Abbe's number and thickness of the cover glass used are designed to be $n_d$=1.521, $v_d$=56.02 and d=0.17 mm.

EXAMPLE 1

| | | | |
|---|---|---|---|
| $r_1 = \infty$ | $d_1 = 0.5100$ | $n_{d1} = 1.78650$ | $v_{d1} = 50.00$ |
| $r_2 = -3.4374$ | $d_2 = 2.1700$ | $n_{d2} = 1.88300$ | $v_{d2} = 40.78$ |
| $r_3 = -2.2093$ | $d_3 = 0.1325$ | | |
| $r_4 = -10.9949$ | $d_4 = 2.4500$ | $n_{d3} = 1.88300$ | $v_{d3} = 40.78$ |
| $r_5 = -5.8271$ | $d_5 = 0.1997$ | | |
| $r_6 = 12.6750$ | $d_6 = 5.3200$ | $n_{d4} = 1.43875$ | $v_{d4} = 94.97$ |
| $r_7 = -22.9089$ | $d_7 = 1.2000$ | $n_{d5} = 1.71300$ | $v_{d5} = 53.84$ |
| $r_8 = 10.1935$ | $d_8 = 7.3000$ | $n_{d6} = 1.43875$ | $v_{d6} = 94.97$ |
| $r_9 = -9.0192$ | $d_9 = 0.2000$ | | |
| $r_{10} = 8.0162$ | $d_{10} = 4.8000$ | $n_{d7} = 1.61800$ | $v_{d7} = 63.38$ |
| $r_{11} = -20.6259$ | $d_{11} = 1.2500$ | $n_{d8} = 1.74000$ | $v_{d8} = 31.71$ |
| $r_{12} = 5.2036$ | $d_{12} = 1.0000$ | | |
| $r_{13} = 5.6171$ | $d_{13} = 5.4000$ | $n_{d9} = 1.43875$ | $v_{d9} = 94.97$ |
| $r_{14} = -6.1286$ | $d_{14} = 1.2000$ | $n_{d10} = 1.64450$ | $v_{d10} = 40.82$ |
| $r_{15} = -28.4328$ | $d_{15} = 0.2334$ | | |
| $r_{16} = 8.1214$ | $d_{16} = 4.9000$ | $n_{d11} = 1.43875$ | $v_{d11} = 94.97$ |
| $r_{17} = -13.9811$ | $d_{17} = 2.6848$ | $n_{d12} = 1.61340$ | $v_{d12} = 43.84$ |
| $r_{18} = 6.8433$ | $d_{18} = 1.3000$ | | |
| $r_{19} = -2.6403$ | $d_{19} = 3.0112$ | $n_{d13} = 1.64450$ | $v_{d13} = 40.82$ |
| $r_{20} = 14.3617$ | $d_{20} = 2.5400$ | $n_{d14} = 1.80518$ | $v_{d14} = 25.43$ |
| $r_{21} = -7.4872$ | | | |

$R_3 = 5.2036$
$R_4 = 5.6171$
$f_3 = -33.621$
(1) $R_3/R_4 = 0.926$
(2) $f/f_3 = -0.054$

EXAMPLE 2

| | | | |
|---|---|---|---|
| $r_1 = \infty$ | $d_1 = 0.5100$ | $n_{d1} = 1.78650$ | $v_{d1} = 50.00$ |
| $r_2 = -3.5000$ | $d_2 = 2.1700$ | $n_{d2} = 1.88300$ | $v_{d2} = 40.78$ |
| $r_3 = -2.2069$ | $d_3 = 0.1325$ | | |
| $r_4 = -7.6704$ | $d_4 = 2.4500$ | $n_{d3} = 1.88300$ | $v_{d3} = 40.78$ |
| $r_5 = -5.1439$ | $d_5 = 0.1997$ | | |
| $r_6 = 11.5611$ | $d_6 = 5.3200$ | $n_{d4} = 1.43875$ | $v_{d4} = 94.97$ |
| $r_7 = -126.3986$ | $d_7 = 1.2000$ | $n_{d5} = 1.71300$ | $v_{d5} = 53.84$ |
| $r_8 = 10.0151$ | $d_8 = 7.3000$ | $n_{d6} = 1.43875$ | $v_{d6} = 94.97$ |
| $r_9 = -10.1436$ | $d_9 = 0.2000$ | | |
| $r_{10} = 8.8086$ | $d_{10} = 4.8000$ | $n_{d7} = 1.61800$ | $v_{d7} = 63.38$ |
| $r_{11} = -11.6721$ | $d_{11} = 1.2500$ | $n_{d8} = 1.74000$ | $v_{d8} = 31.71$ |
| $r_{12} = 6.2427$ | $d_{12} = 0.9000$ | | |
| $r_{13} = 5.4730$ | $d_{13} = 5.4000$ | $n_{d9} = 1.43875$ | $v_{d9} = 94.97$ |
| $r_{14} = -6.5046$ | $d_{14} = 1.2000$ | $n_{d10} = 1.64450$ | $v_{d10} = 40.82$ |
| $r_{15} = -26.5678$ | $d_{15} = 0.2334$ | | |
| $r_{16} = 9.2718$ | $d_{16} = 4.9000$ | $n_{d11} = 1.43875$ | $v_{d11} = 94.97$ |
| $r_{17} = -3.0588$ | $d_{17} = 1.0000$ | $n_{d12} = 1.61340$ | $v_{d12} = 43.84$ |
| $r_{18} = 7.4439$ | $d_{18} = 1.3000$ | | |
| $r_{19} = -2.5688$ | $d_{19} = 1.7556$ | $n_{d13} = 1.74000$ | $v_{d13} = 31.71$ |
| $r_{20} = 93.1630$ | $d_{20} = 2.5400$ | $n_{d14} = 1.80518$ | $v_{d14} = 25.43$ |
| $r_{21} = -5.1322$ | | | |

$R_3 = 6.2427$
$R_4 = 5.473$
$f_3 = -37.433$
(1) $R_3/R_4 = 1.14$
(2) $f/f_3 = -0.048$

EXAMPLE 3

| | | | |
|---|---|---|---|
| $r_1 = \infty$ | $d_1 = 0.4300$ | $n_{d1} = 1.51633$ | $v_{d1} = 64.15$ |
| $r_2 = -0.7360$ | $d_2 = 3.4356$ | $n_{d2} = 1.78650$ | $v_{d2} = 50.00$ |
| $r_3 = -2.9864$ | $d_3 = 0.1992$ | | |
| $r_4 = -107.1427$ | $d_4 = 3.1452$ | $n_{d3} = 1.56907$ | $v_{d3} = 71.30$ |
| $r_5 = -7.3492$ | $d_5 = 0.1999$ | | |
| $r_6 = -26.1330$ | $d_6 = 1.0000$ | $n_{d4} = 1.78650$ | $v_{d4} = 50.00$ |
| $r_7 = 10.1905$ | $d_7 = 5.3000$ | $n_{d5} = 1.43875$ | $v_{d5} = 94.97$ |
| $r_8 = -10.0289$ | $d_8 = 0.2000$ | | |
| $r_9 = 7.0602$ | $d_9 = 5.0826$ | $n_{d6} = 1.43875$ | $v_{d6} = 94.97$ |
| $r_{10} = -69.6153$ | $d_{10} = 1.0954$ | $n_{d7} = 1.64450$ | $v_{d7} = 40.82$ |
| $r_{11} = 5.3372$ | $d_{11} = 1.5962$ | | |
| $r_{12} = 9.7321$ | $d_{12} = 4.0024$ | $n_{d8} = 1.43875$ | $v_{d8} = 94.97$ |
| $r_{13} = -7.7983$ | $d_{13} = 0.9000$ | $n_{d9} = 1.64450$ | $v_{d9} = 40.82$ |

-continued

| | | | |
|---|---|---|---|
| $r_{14} = -28.1461$ | $d_{14} = 0.3000$ | | |
| $r_{15} = 6.6682$ | $d_{15} = 5.5793$ | $n_{d10} = 1.43875$ | $v_{d10} = 94.97$ |
| $r_{16} = -10.9329$ | $d_{16} = 7.0984$ | $n_{d11} = 1.52944$ | $v_{d11} = 51.72$ |
| $r_{17} = 3.6004$ | $d_{17} = 6.3491$ | | |
| $r_{18} = -3.7102$ | $d_{18} = 2.1182$ | $n_{d12} = 1.50378$ | $v_{d12} = 66.81$ |
| $r_{19} = 13.3645$ | $d_{19} = 3.6566$ | $n_{d13} = 1.63636$ | $v_{d13} = 35.37$ |
| $r_{20} = -8.3730$ | | | |
| $R_3 = 5.3372$ | | | |
| $R_4 = 9.7321$ | | | |
| $f_3 = -33.789$ | | | |
| (1) $R_3/R_4 = 0.548$ | | | |
| (2) $f/f_3 = -0.053$ | | | |

Each of the above-exemplified objective is used in combination with an image-formation lens the data on which are given below by way of example, and one section of which is shown in FIG. 3. In the data, $r_1'$, $r_2'$, . . . are the radii of the lens surfaces as indicated in order from the object side; $d_1'$, $d_2'$, . . . are the separations between the lens surfaces as indicated in order from the object side; $n_{d1}'$, $n_{d2}'$, . . . are the d-line indices of refraction of the lenses as indicated in order from the object side; and $v_{d1}'$, $v_{d2}'$, . . . are the Abbe's number of the lenses as indicated in order from the object side.

$r_1'=68.7541$, $d_1'=7.7321$, $n_{d1}'=1.48749$, $v_{d1}'=70.20$
$r_2'=-37.5679$, $d_2'=3.4742$, $n_{d2}'=1.80610$, $v_{d2}'=40.95$
$r_3'=-102.8477$, $d_3'=0.6973$
$r_4'=84.3099$, $d_4'=6.0238$, $n_{d3}'=1.83400$, $v_{d3}'=37.16$
$r_5'=-50.7100$, $d_5'=3.0298$, $n_{d4}'=1.64450$, $v_{d4}'=40.82$
$r_6'=40.6619$

Figure 5A:
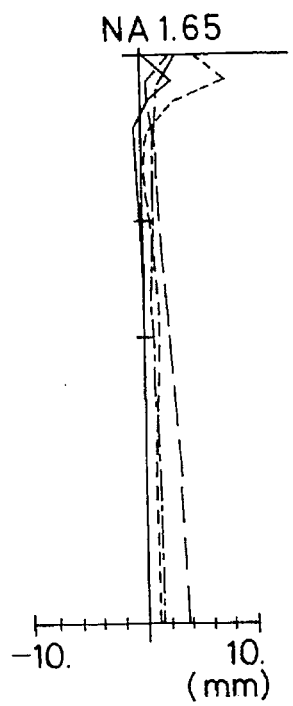
FIGS. 5(a) to 5(c) are aberration diagrams showing the spherical aberration, astigmatism and distortion of Example 2.
Figure 5B:
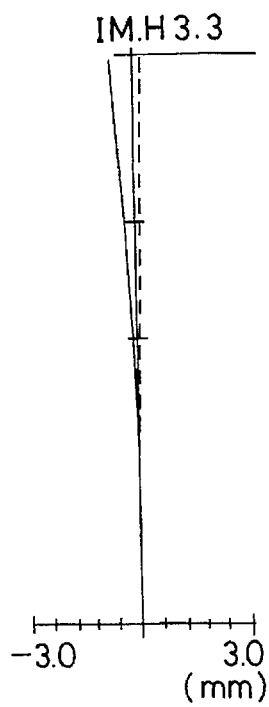
Figure 5C:
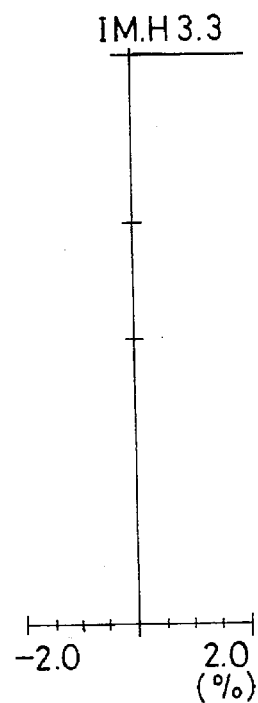
Figure 6A:
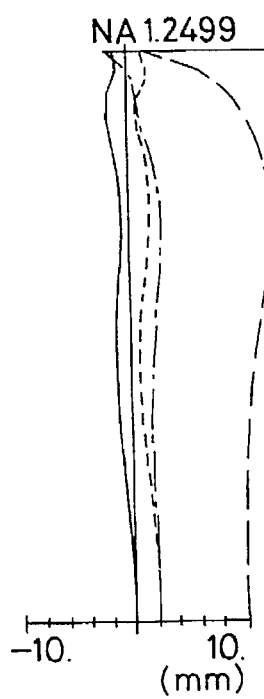
FIGS. 6(a) to 6(c) are aberration diagrams showing the spherical aberration, astigmatism and distortion of Example 3, and FIGS. 7(a) and 7(b) schematically show the construction of a microscope with which the inventive objective is used, and illustrate the end portion of the objective on an enlarged scale.
Figure 6B:
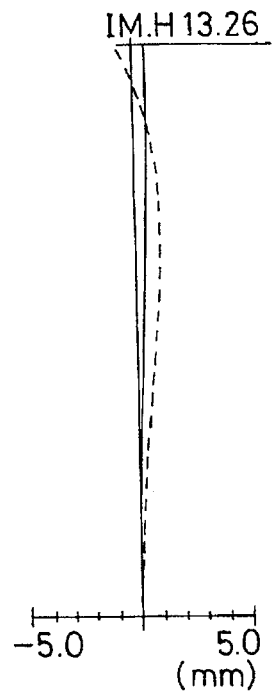
Figure 6C:
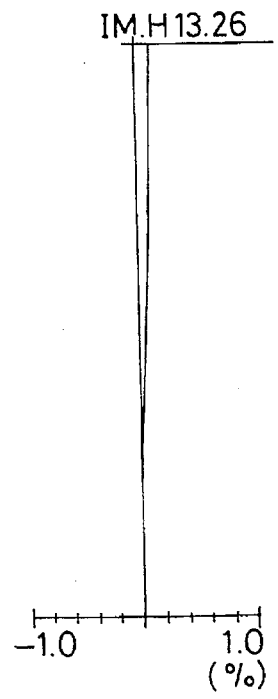

The separation between each objective and the image-formation lens of FIG. 3 may lie somewhere between 50 mm and 170 mm. The spherical aberrations (a), astigmatisms (b) and distortions (c) of Examples 1, 2 and 3 at a typical separation of 105 mm are shown in FIGS. 4, 5 and 6. However, it is to be understood that similar aberrations are observed at separations of 50 mm to 170 mm.

Figure 7A:
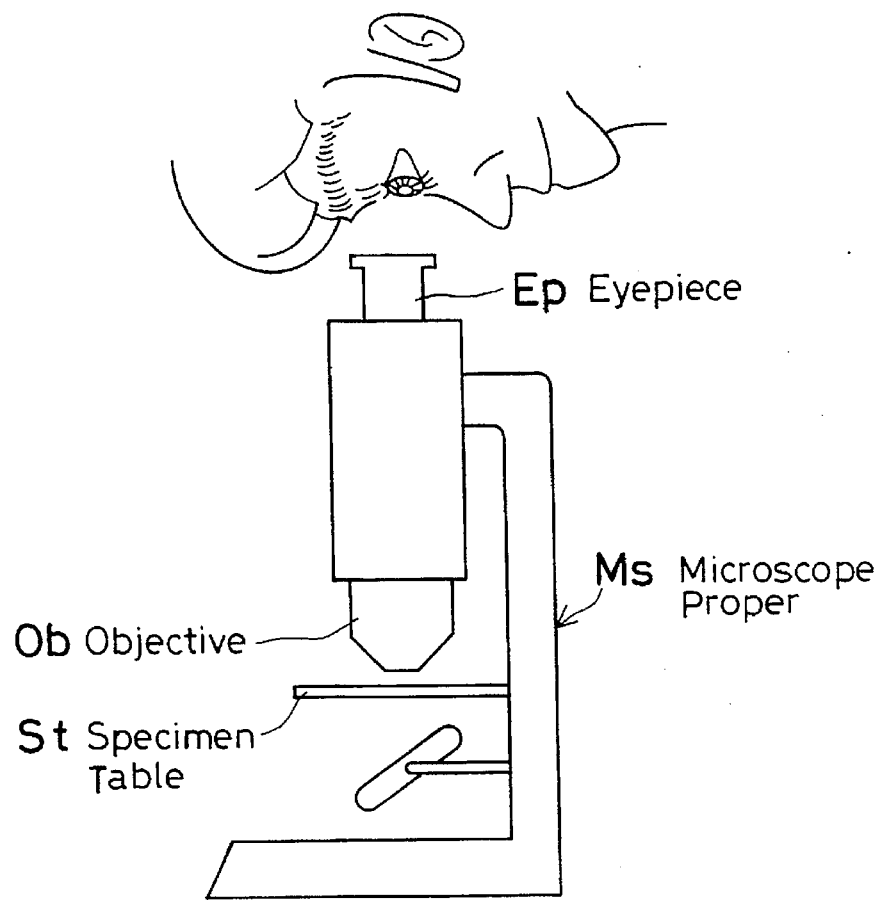
Figure 7B:
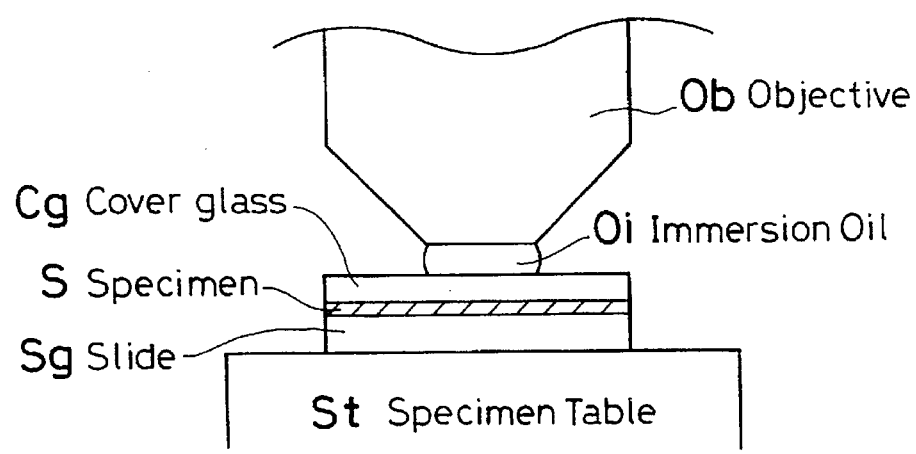

A brief account will now be given of the schematic construction and action of the microscope on which the inventive immersion microscope objective is used. The immersion microscope is schematically shown in FIG. 7(a), and an end portion of the objective is shown in FIG. 7(b) on an enlarged scale. A microscope proper Ms is made up of an objective Ob, an eyepiece Ep, a specimen table St, and the like. An immersion oil Oi is added dropwise onto a cover glass Cg, while placed on the specimen table St is a specimen S held between a slide Sg and the cover glass Cg. As the objective Ob is brought close to the cover glass Cg, the gap between the objective Ob and the cover glass Cg is filled with the immersion oil Oi. With the gap between the objective Ob and the specimen S filled with the immersion oil Oi, it is possible to observe the image of the specimen with a magnification higher than would be possible with a dry objective system including an air gap layer, because a high-NA luminous flux from the specimen S is incident on the objective lens, contributing to image formation. In addition, the resultant image is improved in view of aberrations.

According to the present invention as explained above, it is possible to provide an immersion microscope objective which can have a magnification of about 100× and a high NA of the order of 1.65 and is particularly improved in terms of axial optical properties.

What we claims is:

1. An immersion microscope objective comprising, in order from an object side:

a first lens unit having positive refracting power as a whole, said first lens unit including a cemented lens with a cemented surface being concave on an object side;

a second lens unit having positive refracting power as a whole and including a cemented lens of at least two lens components;

a third lens unit having negative refracting power as a whole, said third lens unit including a convex surface on an object side, and said third lens unit being concave on an image side surface;

a fourth lens unit having positive refracting power as a whole and including a convex surface on an object side;

a fifth lens unit including a convex surface on an object side, and said fifth lens unit being concave on an image side; and a sixth lens unit including a concave surface on an object side, said sixth lens unit being convex on an image side.

2. An immersion microscope objective comprising, in order from an object side:

a first lens unit having positive refracting power as a whole and including a cemented lens with a cemented surface being concave on an object side;

a second lens unit having positive refracting power as a whole and including a cemented lens of at least two lens components;

a third lens unit having negative refracting power as a whole, said third lens unit including a convex surface on an object side, and said third lens unit being concave on an image side surface;

a fourth lens unit having positive refracting power as a whole and including a convex surface on an object side surface;

a fifth lens unit including a convex surface on an object side, said fifth lens unit being concave on an image side; and a sixth lens unit including a concave surface on an object side, said sixth lens unit being convex on an image side;

said immersion microscope objective further conforming to the following condition (1):

$$0.2 < R_3/R_4 < 1.3 \tag{1}$$

where $R_3$ is a radius of curvature of said image side surface of said third lens unit, and $R_4$ is a radius of curvature of said object side surface of said fourth lens unit.

3. An immersion microscope objective comprising:

a plurality of lens units with an immersion oil being applied to a lens surface of a foremost object side for observation;

a foremost object side lens of said plurality of lens units having an index of refraction of at least 1.6.

4. An immersion microscope objective comprising, in order from an object side:

a first lens unit having positive refracting power as a whole and including a cemented lens with a cemented surface being concave on an object side;

a second lens unit having positive refracting power as a whole;

a third lens unit having negative refracting power as a whole;

a fourth lens unit having positive refracting power as a whole;

a fifth lens unit with a concave surface being located on an image side; and a sixth lens unit with a concave surface being located on an object side.

5. The immersion microscope objective according to claim 3, wherein said plurality of lens units comprise, in order from an object side:

a first lens unit having positive refracting power as a whole and including a cemented lens with a cemented surface being concave on an object side;

a second lens unit having positive refracting power as a whole;

a third lens unit having negative refracting power as a whole;

a fourth lens unit having positive refracting power as a whole;

a fifth lens unit with a concave surface being located on an image side; and a sixth lens unit with a concave surface being located on an object side.

6. The immersion microscope objective according to claim 4, wherein:

said second lens unit includes a cemented triplet.

7. The immersion microscope objective according to claim 3, wherein:

said plurality of lens units include a first lens unit on an object side of said immersion microscope objective, said first lens unit having a positive refracting power as a whole and including a cemented lens with a cemented surface being concave on an object side.

8. The immersion microscope objective according to claim 4, 5 or 6, wherein:

said second lens unit includes a cemented triplet consisting of a positive lens, a negative lens, and a positive lens.

9. The immersion microscope objective according to claim 4, 5 or 6, wherein:

said third lens unit includes a convex surface on an object side, said third lens unit being concave on an image side.

10. The immersion microscope objective according to claim 4, 5 or 6, wherein:

said fourth lens unit includes a convex surface on an object side.

11. The immersion microscope objective according to claim 4, 5 or 6, wherein:

said fifth lens unit includes a convex surface on an object side.

12. The immersion microscope objective according to claim 4, 5 or 6, wherein:

said sixth lens unit is convex on an image side.

13. The immersion microscope objective according to claim 4, 5 or 6, said immersion microscope objective satisfying the following condition (1):

$$0.2 < R_3/R_4 < 1.3 \tag{1}$$

where $R_3$ is a radius of curvature of an image side surface of said third lens unit, and $R_4$ is a radius of curvature of an object side surface of said fourth lens unit.

14. The immersion microscope objective according to claim 4, 5 or 6, said immersion microscope objective satisfying the following condition (2):

$$f/f_3 < -0.01 \tag{2}$$

where $f_3$ is a focal length of said third lens unit, and f is an overall focal length of said immersion microscope objective.

15. An immersion microscope objective according to claim 3, wherein:

said foremost object side lens of said plurality of lens units has an index of refraction of at least 1.7.

16. An immersion microscope objective according to claim 7, wherein:

said foremost object side lens of said plurality of lens units has an index of refraction of at least 1.7.

* * * * *